Sept. 6, 1932.  H. HIRSCH  1,875,870
LAUNDRY LIST PRINTER AND COUNTER
Filed Nov. 19, 1931  5 Sheets-Sheet 4
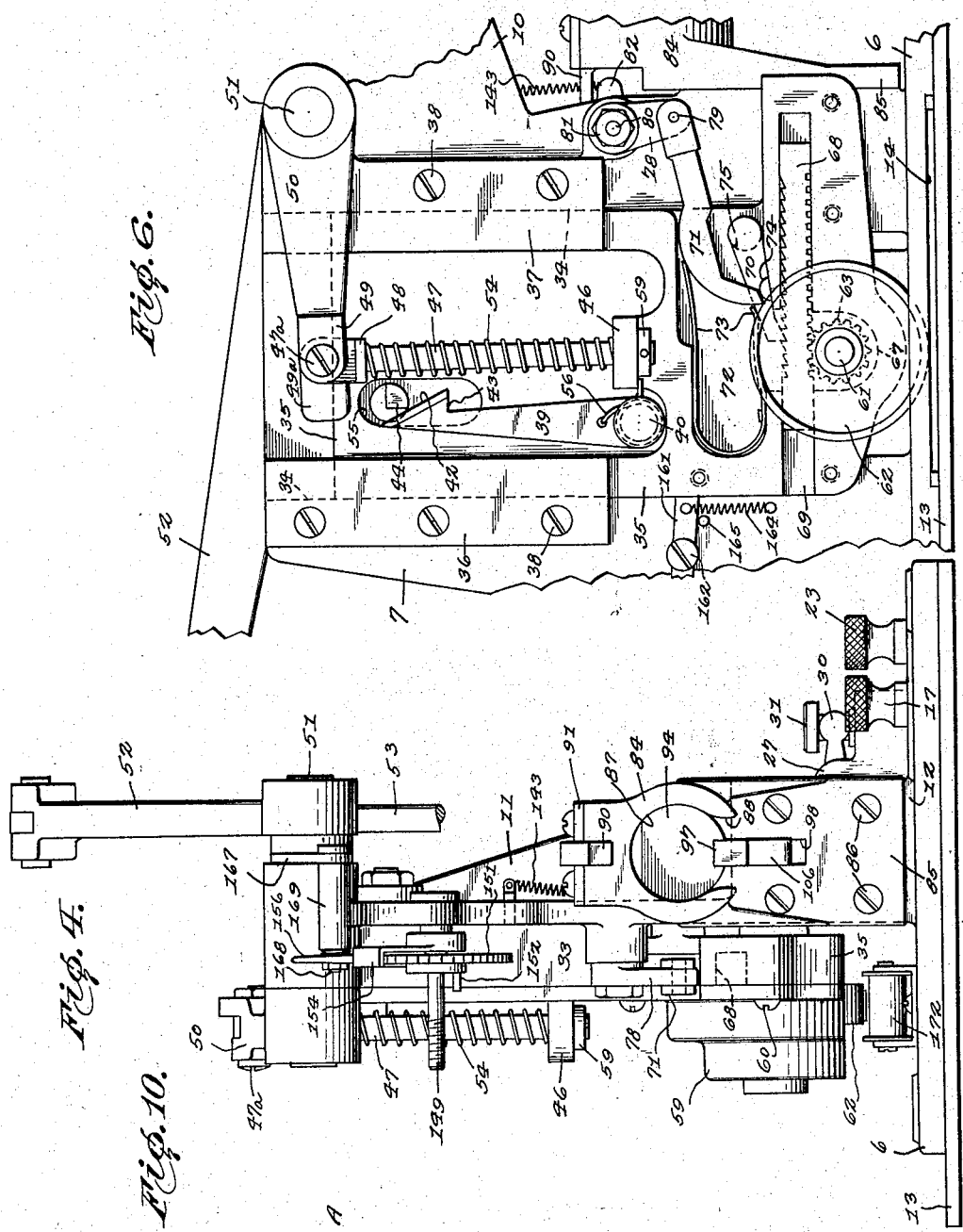
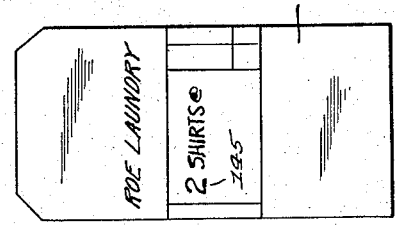
Inventor:
Henry Hirsch.
By F. V. Winters
Attorney

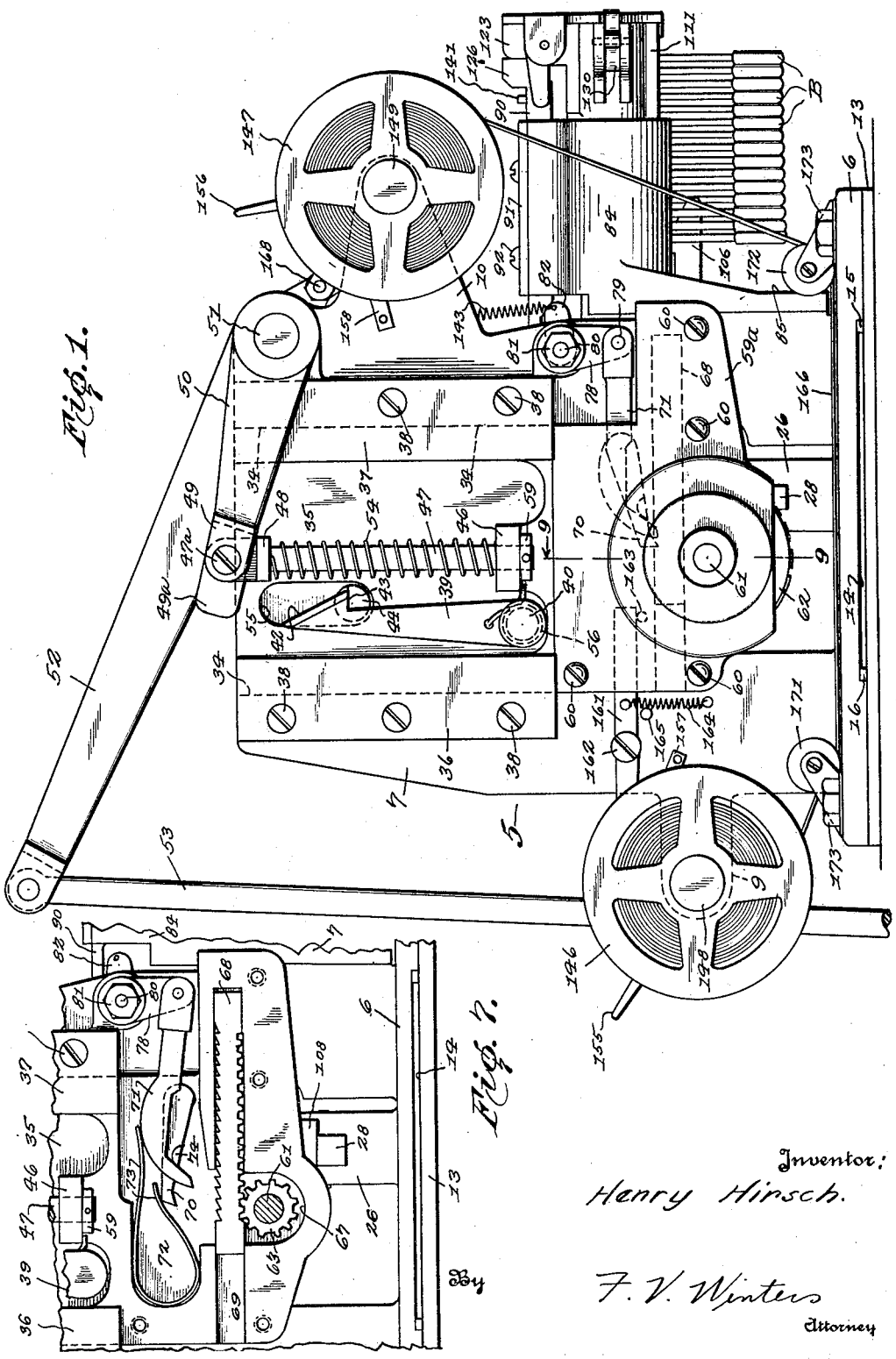

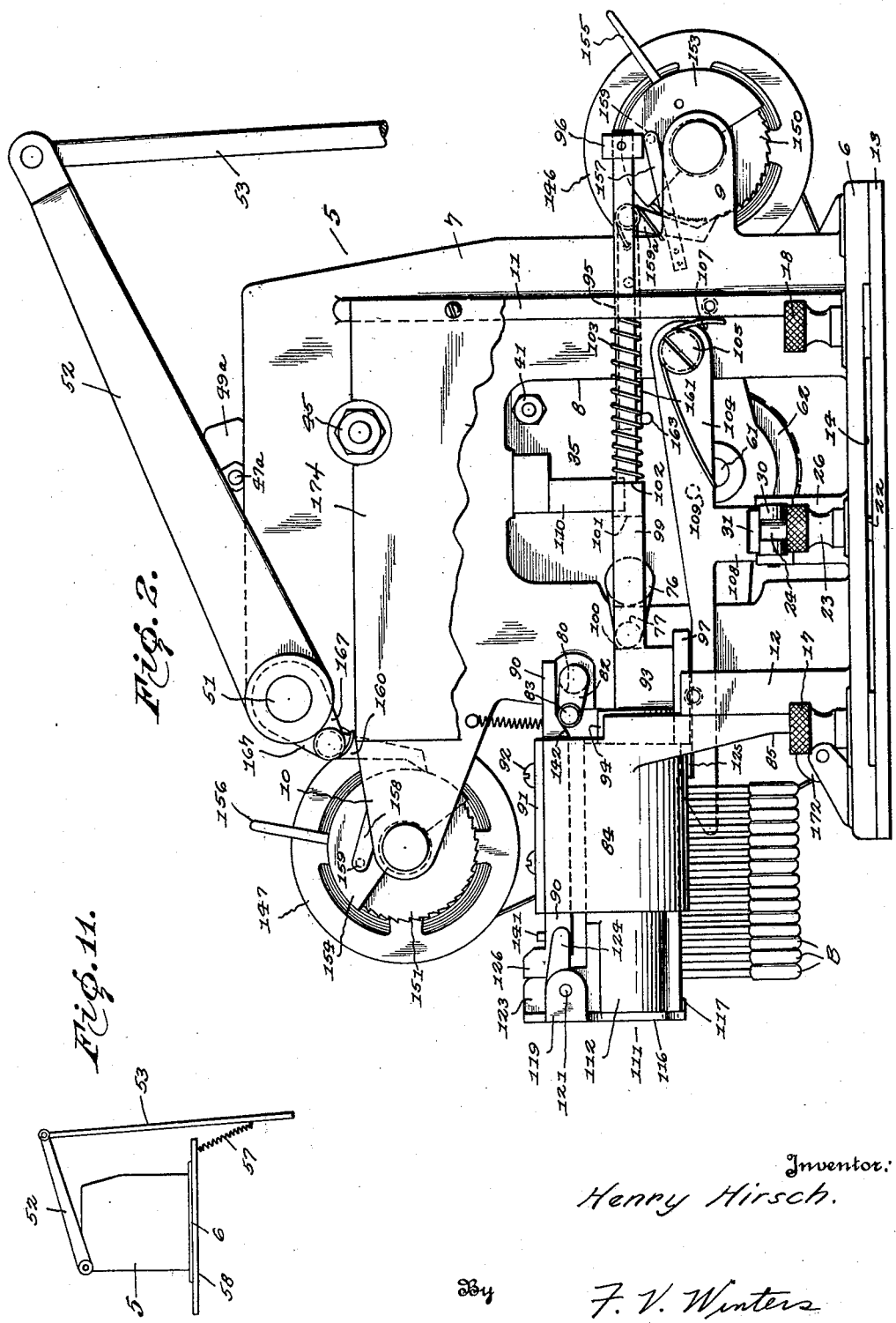

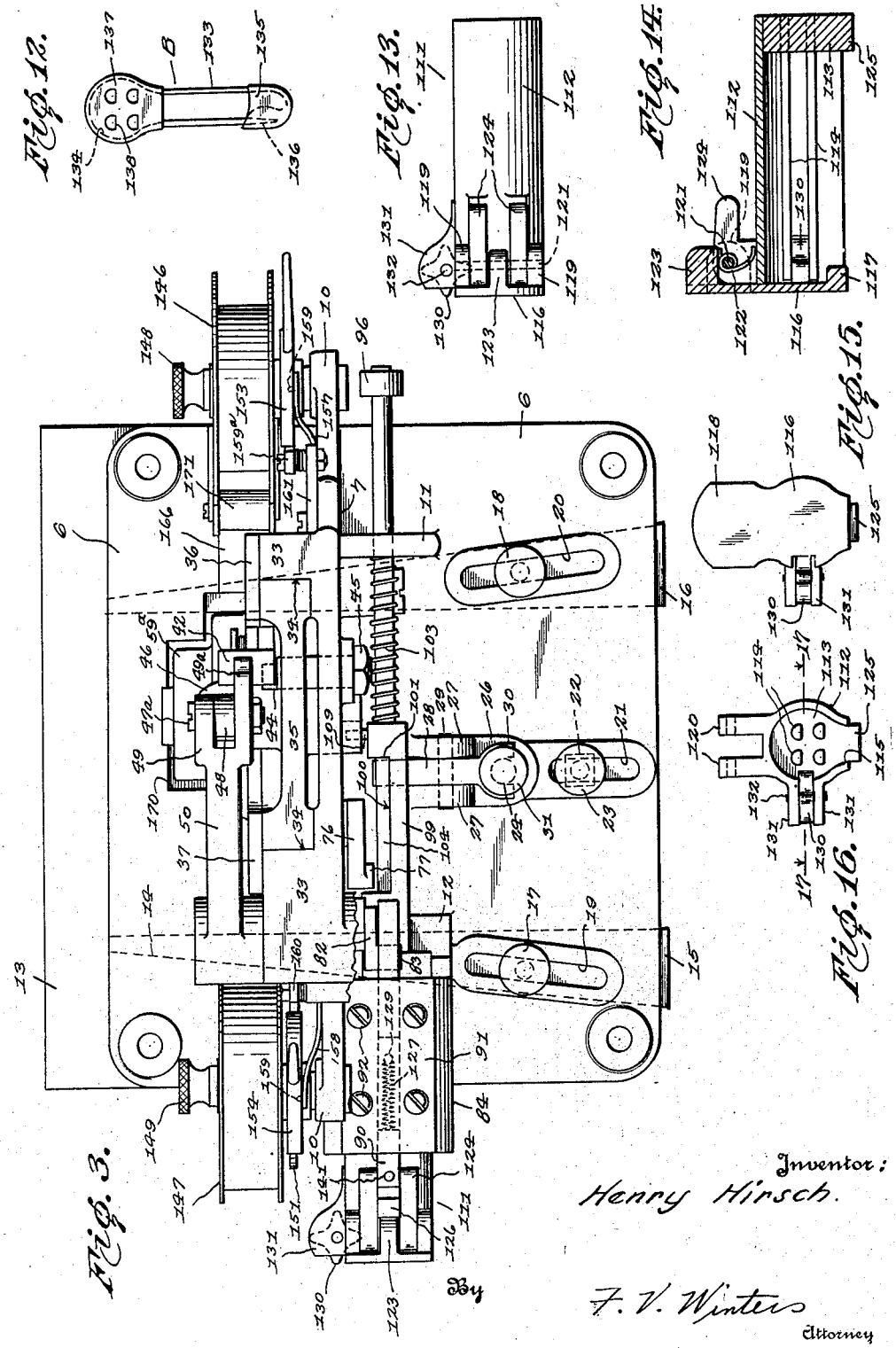

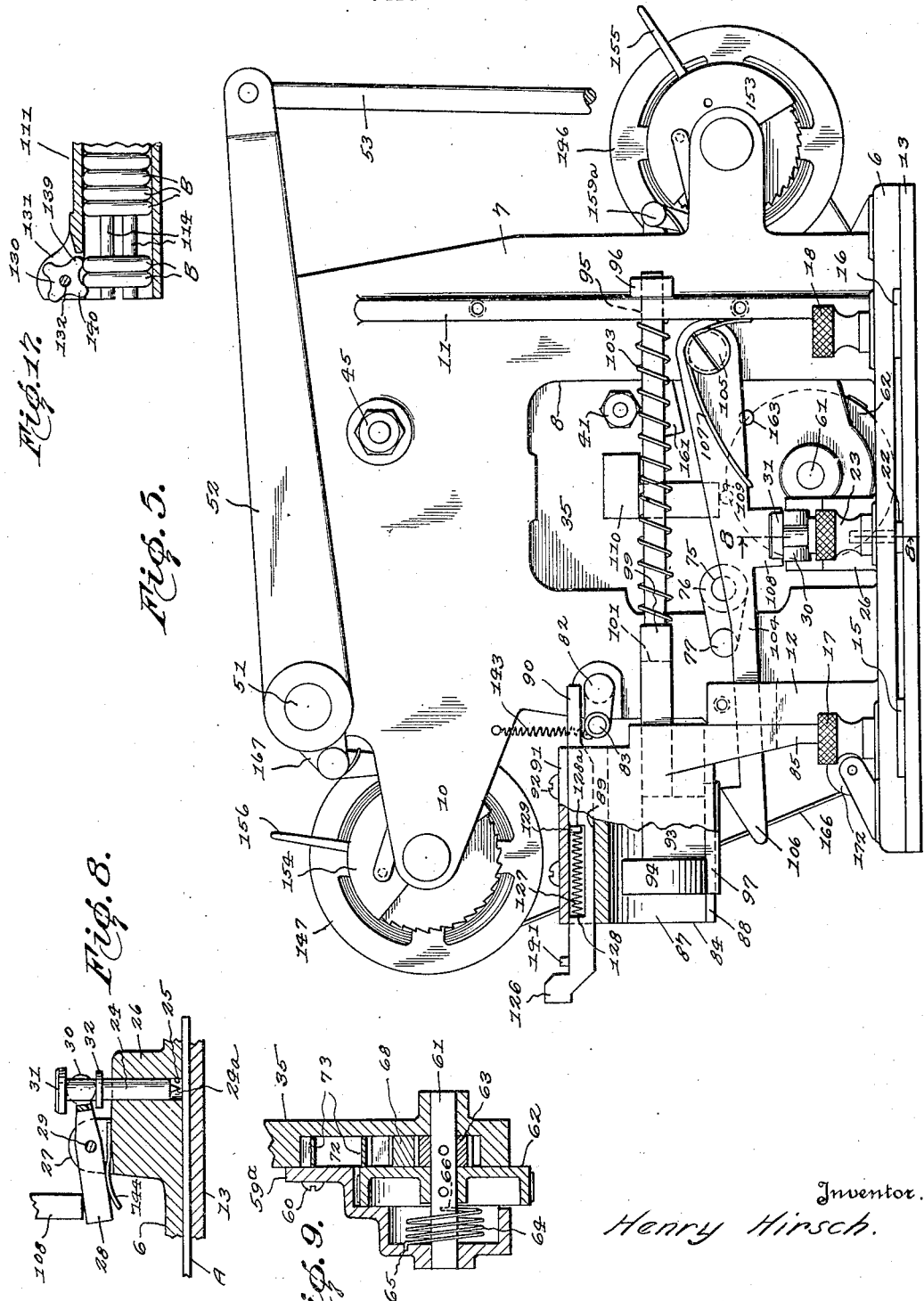

Patented Sept. 6, 1932

1,875,870

UNITED STATES PATENT OFFICE

HENRY HIRSCH, OF JERSEY CITY, NEW JERSEY

LAUNDRY LIST PRINTER AND COUNTER

Application filed November 19, 1931. Serial No. 576,197.

This invention relates to a laundry list printer and counter adapted to count the selected articles contained in a laundry bundle and to print on a laundry list or tag the result of the count of said articles.

According to the present practice in many laundering or cleaning establishments, printed slips of paper are used which contain a list of all kinds of articles that may be laundered, and in listing the contents of a laundry bundle a suitable check is sometimes made on one of the printed lists on the name of each article thereon, corresponding to a like article or articles in said bundle, and the number of each of the articles in the bundle is written by hand on said slip opposite the name of said article which has been checked on the slip.

In order that the articles coming from individual customers may be identified, segregated and packed after the laundering process has been completed, it is also customary to affix certain identifying means, preferably in the form of a pin or check, to each article prior to said process, said pin or check remaining attached to the article during the washing or laundering operation, the pins in the above instance being associated with an individual holder whereby only the pins originally contained in said holder may again be entered therein. From the foregoing it will be seen that the printed list of laundered articles will have written thereon the number of each article in the bundle received from the customer and the accuracy of this number depends on the efficiency of the clerk in making an accurate count of the articles. Further, each article has affixed thereto a check or identifying pin. In the assembling or packing room the aforesaid pin holder and the sheet or slip containing the laundry list, and which has written thereon the number of the articles received from a customer, await the coming of the laundered articles, and when said articles are received the clerk observes the pins attached to the articles and as the written laundry list indicates the number of articles to be expected it is only necessary to find the pins corresponding to a pin holder and the articles are then ready for packing and delivery.

In view of the fact that the articles received from a customer have attached thereto only like pins or checks coming from a single pin holder, and since only such pins or checks can be again entered into the holder for identifying purposes, as aforesaid, this portion of the present practice in launderies admirably serves for purposes of identification. But the count of the articles by the clerk and the entry on the laundry slip of the number of the articles cannot be depended upon and quite frequently the said slip will indicate that four shirts have been received from a customer and after this quantity of shirts have been packed for delivery, or actually sent to a customer, another shirt will be found bearing an identifying pin belonging to a holder temporarily reserved for that particular customer.

Briefly, the disadvantage of this practice is that the clerk frequently makes an error in the count of the articles and thus enters the wrong number on the list, and hence, the assembler makes a further error of sending out the completed laundry as soon as the number of articles located agrees with the written number on the laundry list. Obviously, should the number entered on the laundry slip be greater than the number of identifying pins issued, great delay occurs in the attempt to locate an article, which, according to the inaccurate slip, may be somewhere in the laundering establishment or in the possession of another customer.

It is, therefore, the primary object of the present invention to provide a machine that will prevent mistakes in listing the number of the articles, since it will print only the number of a particular article contained in a laundry bundle.

Another object is to provide a machine adapted to removably receive a holder containing a plurality of identifying pins, said machine embodying printing mechanism adapted to be operated by lifting the lid of the holder as single pins are removed; the operating of said lid for the removal of single pins from the holder operating said printing mechanism step by step so that the quantity-indicating character borne by a type roller embodied in said mechanism will agree with the number of pins removed and will further be in position to print that number on a laundry tag opposite the name of the article to which the pins are to be attached.

Another object of the invention is to provide mechanism wherein the single operation of a foot-pedal, or the like, will cause the pre-set quantity-indicating character to be impressed on a laundry list or tag, will eject the pin holder from the machine and will restore the type roller, bearing the quantity-indicating characters, to its initial position.

Still another object is to provide means for maintaining said type roller in a non-printing position during the removal of said pins from the holder and while said roller is being rotated to bring the proper quantity-indicating character into printing position.

Still another object is to provide means for retaining said pin holder in its receptacle during the counting operation, said means being rendered inoperable during the printing operation to permit the ejectment of said holder from its receptacle.

A further object is to provide novel type roller operating mechanism adapted to be brought into operable position by the insertion of the pin holder within a receptacle and during the removal of individual pins and lifting the lid of the holder.

Still another object of the invention resides in the provision of certain tag locating means whereby said tag may be maintained in proper position before the printing operation and wherein it may be removed after said operation.

With these objects in view, together with others which will appear as the description proceeds, the invention resides in the novel formation, combination, and arrangement of parts, all as will be described more fully hereinafter, illustrated in the drawings, and particularly pointed out in the claims.

In said drawings:

Figure 1 is a front elevation of the machine.

Fig. 2 is a rear elevation of Fig. 1.

Fig. 3 is a top plan view of the machine.

Fig. 4 is an end elevation with the pin holder and the ribbon and spools removed.

Fig. 5 is a rear elevation of the machine showing the parts in position after the printing operation and after the ejectment of the pin holder.

Fig. 6 is a fragmentary front elevation of the machine with the type roller cover removed to expose the positions of the parts therebeneath during the printing operation.

Fig. 7 is a view like unto Fig. 6, but showing the type roller elevated and the positions of the index and type register pawls prior to the insertion of the pin holder into its receptacle of the machine.

Fig. 8 is a sectional detail taken on the line 8—8 of Fig. 5, showing the tag locating pin elevated to permit the removal of said tag.

Fig. 9 is a sectional view taken on the line 9—9 of Fig. 1 depicting the spring-tensioned type roller.

Fig. 10 is a view of the laundry list or tag.

Fig. 11 is a diagrammatic view illustrating the use of a spring to elevate the operating lever after the pressure on a foot pedal, or the like, has been released.

Fig. 12 is a view of the identifying pin or check.

Fig. 13 is a plan view of a pin holder.

Fig. 14 is a central longitudinal sectional view thereof.

Fig. 15 is a front elevation of the holder.

Fig. 16 is a front elevation of the holder with the cover removed.

Fig. 17 is a fragmentary sectional view taken on the line 17—17 of Fig. 16 showing the four point star wheel blocking the removal of more than one pin from the holder at one time.

Referring now more in detail to the accompanying drawings, wherein like characters of reference denote similar parts throughout the several views, let 5 indicate generally the main frame of the machine, said frame embodying a substantially rectangular base 6, (see Fig. 3), and an upstanding portion 7, which rises vertically from said base 6 and which is provided with an opening 8, (see Figs. 2 and 5), extending entirely through said upstanding portion 7 from front to rear and having its upper edge terminating slightly above the mid-section of said portion 7. As shown in Fig. 2 lateral arms 9 and 10 project from the opposite edges of the portion 7 to serve as supports for the ink ribbon feed mechanism which will be described in detail hereinafter. Said main frame also includes a web 11, arranged at right angles to the upstanding portion 7 adjacent the lateral arm 9, and a somewhat similarly disposed block 12 positioned at the left of web 11, (see Figs. 2 and 3).

Upon inspection of Figs. 1, 2 and 3 it will be noted that said base 6 is recessed at its undersurface, and when the plate 13 is affixed to said base there is presented a slot 14 which extends transversely of said base and whose side walls converge from the front to the rear of said base, as indicated clearly by dotted lines in said Fig. 3. This slot 14 is adapted to receive a laundry tag A, of the type shown in Fig. 10, and in order that tags varying in widths may be accommodated slidable plates 15 and 16 are inserted adjacent the side walls of said slot 14 and in view of the thumbscrews 17 and 18, operating in slots 19 and 20 of said base 6, said plates 15 and 16 may be individually and jointly operated to vary the width of said slot 14 for the purpose mentioned hereinbefore. Said base 6 is also provided with another slot 21, arranged intermediate said slots 19 and 20, a headed screw 22, (see Figs. 3 and 5) being slidably arranged in said slot 21 and adapted to be fixed in any position along said slot by means of a thumb nut 23 to adjust the degree of insertion of a tag A into said slot 14. In order that the laundry tag A may be positively arranged in proper position within said slot 14 during the printing operation, I further propose to provide a tag locating pin 24, (see Fig. 8), which is reciprocatorily mounted in the aperture 25 arranged in the boss 26 rising from said base 6. Said boss 26 is provided with a pair of ears 27, (see Fig. 3), which pivotally support the tag release lever 28 by means of pin 29, and it will be noted that said lever 28 is forked at 30 to straddle the pin 24 between its spaced heads 31 and 32, and it is obvious that as said lever 28 is rocked by means to be described in detail hereinafter, said pin 24 will be reciprocated to bring the pin point 24a into engagement with and disengagement from said tag A.

The upper frontal part of said upstanding portion 7 of the main frame 5 presents a relatively thickened portion 33 which is cutaway centrally to present a recess 34 for the reception of a slide 35, (see Figs. 1 and 3), the latter being held in recess 34 by means of gibs 36 and 37 suitably affixed to said upstanding portion 7 as by means of screws 38, or the like. Said slide assumes two positions, that is, the elevated position, shown in Figs. 1 and 7, and the printing position as depicted in Fig. 6, suitable means being provided to maintain said slide in its elevated condition, to drop it to the so-called printing position and finally to restore the same to its initial position, i. e. elevated condition. On reference to Fig. 1 it will be noted that a trip dog 39 is pivotally borne by said slide 35 by means of bolt 40 which passes through said slide to be engaged by nut 41 on the rear face of said slide, (see Fig. 2). The upper portion of said dog 39 is provided with a cam surface 42 and notch 43, the latter being adapted to engage the projected end of pin 44 affixed to the upstanding portion 7 by means of nut 45 also positioned on the rear face of the former. Said slide 35 is also provided with an apertured lug 46, (see Figs. 1 and 4), for the reception of the pressure bar 47 having an apertured head 48 for pivotal engagement with the bifurcated end 49 of the operating lever 50, (see Fig. 3), said lever being affixed to pin 51 pivotally borne by said upstanding portion 7. Said pin 51 also has affixed thereto the pedal lever 52 which pivotally carries the rod 53 at its outer end, said rod extending downwardly for connection to any well-known form of foot pedal mechanism, (not shown). As shown in Figs. 1 and 3, one leg 49a of the bifurcated end 49 is somewhat extended beyond the pivotal connection 47a, between said pressure bar 47 and said lever 50 and also that a contractile spring 54 encircles said bar 47 between said lug 46 and the head 48 of said bar.

From the foregoing it is obvious that when the notch 43 of said trip dog 39 engages the projected end of the pin 44, said slide 35 will be held to its elevated position shown in Fig. 1 and it is also manifest that when disengagement between said notched portion and said pin takes place, said slide will drop by gravity to the so-called printing position shown in Fig. 6. As stated hereinbefore, said operating lever 50 and said pedal lever 52 are pinned to the pin 51 pivotally borne by the main frame, and, obviously, they oscillate in unison. Therefore, the oscillatory motion imparted to said pedal lever 52 by a downward pull on said rod 53 is communicated to said operating lever 50 and this motion causes said pressure bar 47 to slide downwardly through the apertured lug 46, thus tensioning spring 54, and as the rounded end of said leg 49a encounters the cam surface 42 of said dog 39 its continued arcual swing disengages the notch 43 from said pin 44 and the slide is free to drop downwardly to the position indicated in Fig. 6. It will be understood that the spring 54 has been tensioned prior to the disengagement of the dog and pin 44 and as the above disengagement takes place the inertia of said tensioned spring tends to further accentuate the downward movement of said slide, and it may be said that this accentuation imparts a "snap" to said slide which adds to the clarity of the impression made by certain quantity-indicating characters. Of course, when the slide has dropped to the position mentioned, the spring 54 is no longer contracted and said spring assumes the condition shown in said Fig. 6. On inspection of Figs. 1 and 6 it will be noted that said slide 35 is provided with a slot 55 so that the pin 44 borne by the main frame does not interfere with the movement of said slide. Further, it will be noted that said dog 39 is somewhat under the control of spring 56 which has one end secured to said dog and its other end anchored under said lug 46 so that said dog is oscillated toward the right, as viewed in Fig. 1, and assumes the position shown in Fig. 6, that is, with its cam surface 42 bearing against the projected end of said pin 44.

When a downward pull is exerted on the rod 53, as by means of a foot pedal, or the like, the spring 57, which is connected to a suitable support 58 and said rod 53, is tensioned, and as soon as the power applied to said rod 53 is suspended, said spring exerts an upward pull on said rod 53 and this movement is communicated to the pressure bar 47 by way of levers 52—50 and since said bar is provided with an affixed collar 59 beneath said lug 46, the upward movement of the bar is imparted to the slide 35, and in view of the pivotal disposed and spring-pressed dog 39 the upward movement of the slide is continued whilst the pin 44 slidably contacts the cam surface 42 of said dog 39, gently oscillates it to the left until the notch 43 slips over the top of said pin, and thus the slide is restored to its initial position. It will, of course, be understood that the slide is dropped only a sufficient interval of time for the impression to be made on a tag. Further mechanisms operated during the movement of the slide will be explained hereinafter and it will be appreciated at this time that the aforesaid reference to printing refers to a certain type or quantity-indicating character-bearing roller borne by said slide and which is about to be described in detail.

The lower portion of said slide 35, and the parts associated with said portion, are normally concealed by the type roll cover 59a which is affixed to said slide by means of screws 60, and as shown in Fig. 9 said cover and said slide cooperate to serve as journals for the ends of the stub shaft 61, type roll 62 and pinion 63 being affixed to said shaft. The cover is constructed so that the type roll and the spring 64 are housed therein, the latter having one end secured to said cover, as indicated at 65, and having its other end affixed to said shaft 61, as shown at 66. In view of this arrangement it is obvious that a counter-clockwise movement of said shaft and type roll, as viewed in Fig. 1, will tension said spring 64. Upon inspection of Fig. 7 it will be observed that the lower portion of said slide 35 is provided with a plurality of interconnected recesses and in their preferred arrangement, recess 67 receives the pinion 63, while the rack 68 slidably operates in a somewhat elongated recess 69. The bottom of said rack 68 is provided with gear teeth which mesh with the teeth of said pinion 63, whilst the top thereof is supplied with ratchet teeth for cooperation with the type register pawl 70 and the index pawl 71, both operating in the recess 72. A double leaf spring 73, engaging said pawls 70 and 71, is also suitably affixed to the slide 35 within said recess 72. Now the type register pawl 70 is provided with a lug 74 and a shank 75, (see Fig. 6), the latter passing through the slide from front to rear where it receives the bell crank 76, (see Figs. 2 and 5), having a projection 77 at its outer end. The index pawl 71 is pivotally supported by one end of the index lever 78, as indicated at 79, said lever being secured to the shank portion 80, (see Fig. 2), of the bell crank 82, by means of nut 81. It will be noted that said bell crank 82 is provided with a projection 83 at its outer end, and that the shank portion 80 of said bell crank 82 is oscillatorily borne by the upstanding portion 7 of the main frame 5.

The pin holder receptacle 84 is provided with an integral bracket 85 which is suitably apertured for the reception of screws 86 for attachment to the block 12 of the main frame 5. Said receptacle 84 is provided with a bore 87, open at the bottom as indicated at 88, (see Fig. 4), whilst its upper portion is provided with a longitudinally extending slot 89 for the reception of the slidable index bar 90, a closure member 91 being affixed to the top of said receptacle by means of screws 92.

The ejector ram 93 is provided with a head 94, adapted to reciprocate in the bore 87 of said receptacle 84, whilst its other extremity is supported and passed through an aperture 95 in the web 11, a stop collar 96 being suitably affixed to the extreme end of said ram 93. Upon inspection of Figs. 4 and 5 it will be noted that said ram is provided with a rail 97 which rides in the slot 98 formed in the bracket 85 of said receptacle 84, thus preventing twisting or turning of said ram. The intermediate portion 99 of said ram, adjacent the head 94, is recessed, as indicated at 100, to provide operating space for the bell crank 82 and to define a shoulder 101, (see Fig. 3), while the remainder of said ram to the stop collar is preferably circular in cross-section to define an abutment 102 for the spring 103 which encircles the circular portion between said abutment and the web 11.

As shown in Figs. 2 and 5, the control dog 104 is pivotally attached to the upstanding portion 7 of the main frame 5 by means of the screw 105, said dog 104 extending along the rear of said upstanding portion 7 underlying the receptacle 84 with its nose portion 106 urged in intimate contact with said rail 97, in view of the spring 107, when said dog 104 is in the position indicated in Fig. 5. Said dog is also provided with a detent 108 which abuts the lever 28, as shown in Fig. 8, and as shown in Figs. 2 and 3 said dog is also provided with a pin 109 disposed below the block 110 carried by the rear face of said slide 35.

The pin holder 111, which is adapted to be partially housed by said receptacle 84, comprises a somewhat tubular body portion 112, (see Figs. 13 and 14), having a thickened bottom 113 adapted to receive posts 114 extending longitudinally within said body portion. Upon inspection of Fig. 16 it will be noted that said body portion 112 is provided with longitudinally extending opening 115, said opening functioning to permit the assembling of certain identifying pins or checks with the holder, as will presently appear. The open end of said body portion 112 is normally closed by a lid 116, having its lower portion thickened to present a block 117 overhanging said opening 115, while its upper portion is projected to define an extension 118 which is provided with apertured spaced ears 119 which are pivotally connected to the ears 120 of said holder by means of a pin 121. In order that said lid 116 may be urged to a closed position, I provide a coiled tension spring 122 which encircles said pin 121, one end of said spring being held by the lug 123, of the lid 116, whilst its other end abuts the body portion of the holder, so that the opening of said lid tends to tension said spring in the usual manner. Said ears 120 are projected rearwardly, as indicated at 124, (Figs. 13 and 14), and as shown in Fig. 3, said ears straddle the forward end of the index bar 90 to prevent rotation of said pin holder after it is placed therein.

Prior to the insertion of said pin holder 111 into its receptacle 84, the ejector ram 99 is in the position indicated in Fig. 5, and when said holder is entered into said receptacle, the rear portion 113 of said holder encounters the head 94 of the ram 99 and as the insertion is continued the nose portion 106 of said control dog 104 glides along the rail 97 until it snaps over the extension 125 of the rear wall 113, thus maintaining said holder in the position indicated in Fig. 2. At the same time the lug 123 of the lid 116 engages the snout 126 of the index bar 90 and the latter is moved inwardly tensioning spring 127 mounted within a recess 128 formed in said bar 90, (see Fig. 5). It will be noted that one end of said spring abuts one wall of said recess 128 whilst its other end encounters a fixed pin 129 carried by the closure member 91.

The pin holder 111 is somewhat similar to the laundry device described and claimed in my Patent No. 1,817,821, dated Aug. 4, 1931, with the exception that in the present instance I have provided means whereby only one pin or check can be entered into, or removed from said holder, at one time. Said means embodies a four-point star wheel 130 which is rotatably mounted between spaced ears 131 of the holder 111, by means of pin 132, as shown in Fig. 16. As shown in Fig. 17 the pins B are juxtaposed along the posts 114, each of said pins, in the present instance, comprising a single piece of wire 133, (see Fig. 12), which is formed with a loop 134, one of the projecting ends being secured within a shield 135, while the other end presents a sharpened portion 136 which may be sheathed within said shield or removed therefrom as desired. A plate 137 fits over said loop 134, the marginal portion thereof being preferably bent around said loop, and as shown in Fig. 12, said plate is provided with a plurality of apertures 138 having a cross-sectional area equal to the cross-sectional area of said posts 114 and corresponding in arrangement therewith.

Returning now to Fig. 17 it will be noted that in the event it is attempted to remove more than one pin at a time from the pin holder, the second pin is encountered by the tooth 139 of the wheel 130, thus retarding and preventing the rotation of the latter, in view of the apparent binding action. As the adjacent tooth 140 is positioned in advance of the first pin and has its end portion abutting the same, it is obvious that neither pin can be removed until the second pin is moved rearwardly to permit the escape of said tooth 139 and the subsequent turning of the tooth 139. When a single pin is removed, it encounters one tooth and as the particular pin used has a thickness less than the intervening space between the adjacent teeth, said pin is passed freely between said teeth. This is a feature of some importance. While the present disclosure shows the adoption of a four-point star wheel, which is actuated and permitted to rotate freely in view of the corresponding thickness of the pin, it will be understood that in view of the varying thicknesses of the pins that will be used in many instances, the four-point arrangement will be subjected to some variation and obviously in some instances said star will be provided with a varying number of points to permit the release of one of the several size pins which vary in thickness.

As pointed out in my aforesaid patent, a single pin holder is provided for each article, or each class of articles, or even for the particular articles received from a customer of the laundry. On the other hand a plurality of pins or checks will be provided, each pin having apertures in its plate 137 shaped and positioned to register with the posts of a holder, and hence only articles bearing a pin, corresponding to the posts in a holder, can be assembled together. The arrangement or shape of the posts is not fixed, since it is possible to arrange numerous combinations by varying the spaces between the posts and the cross-sectional area thereof.

Hereinbefore it has been pointed out how the pin holder 111 is held in position within the receptacle 84 and its operation on the index bar 90 wherein the latter is adapted to be reciprocated within the slot 89. And it has been shown how the slide 35 and the type roll 62 are held in an elevated position, dropped to printing position and restored to their initial condition. However, before said pin holder is inserted within the receptacle 84 a certain operation is necessary attending the handling of articles received in a laundry and the operation of the machine and its further details of construction will be explained after this operation has been pointed out.

After the articles in a bundle of laundry have been examined, the clerk selects a pin holder for the customer and a laundry tag on which is written the name of the customer, and in the event a single class of articles is being handled, the tag used will be similar to that shown in Fig. 10 and for purposes of illustration it is assumed that shirts constitute the class of articles in hand. The holder will, of course, contain a plurality of pins and in the present exemplification the number of pins contained will be considered as 16, though this number will vary in many instances. The clerk now removes a single pin from the holder and affixes the same to the tag and thus it is obvious that in this instance fifteen pins remain in the holder when the latter is inserted in its receptacle 84, as shown in Fig. 1. An examination of the bundle of laundry reveals that two shirts have been sent in by the customer, whereupon the clerk grasps a single pin, slides the same along the posts 114 in the holder and as it passes the wheel 130 the lid 116 is encountered, the latter opening sufficiently to permit the removal of the pin and as it swings on its pivot the lug 123 presses against the snout 126 of the index bar 90 and slides the same inwardly and tensioning the spring 127 explained hereinbefore. Pin 141 carried by said bar 90 prevents undue inward movement of the latter.

Upon inspection of Fig. 2 it will be seen that the said index bar 90 is provided with a cam surface 142 which contacts the projection 83 of said bell crank 82 when the holder is inserted within the receptacle 84, and it is obvious that the inward movement of said index bar 90 causes said cam surface 142 to depress said projection 83 and the bell crank 82 oscillates downwardly, which movement is transferred to the index lever 78, (see Fig. 1) to move the index pawl 71 toward the center of the machine. In said Fig. 1, the rack bar 68 is shown in dotted outline and when the said machine and its parts are in the position shown in Fig. 1, said index pawl 71 and type register pawl 70 will both be in engagement with the ratchet teeth arranged in the top of said rack bar. An inspection of Fig. 7 will reveal the precise construction of said rack bar. In Fig. 4 said rack bar 68 has its end in dotted outline and it will be appreciated that it is of sufficient width to permit the arrangement of said pawls 70 and 71 in juxtaposition without interference in their movements. It is now apparent that as the index pawl moves toward the center of the machine its engagement with the ratchet teeth of said rack bar causes the latter to advance one tooth and in view of the enmeshment of the gear teeth of the rack bar with those of the pinion 63, the type roller 62 is turned, and further since the rotation of said roller is counter-clockwise, said spring 64 begins to tension. It is obvious that the end of said pawl 70 rides over one ratchet tooth as the rack bar advances and when the pawl 71 has performed its operation, said pawl slips behind the next ratchet tooth to hold the bar 68 in its advanced position.

As soon as the pin has been removed from its holder, the spring-tensioned lid 116 closes and this movement permits the index bar 90 to slide outwardly, in view of the tensioned spring 127 and this outward movement is of course limited by the abutment of the end wall 128a of said recess 128 and the pin 129. At this time the cam surface 142 is retracted to permit the upward swing of the bell crank 82, (see Fig. 5) and in view of the spring 143, the index lever 78 and the index pawl 71 swing back to their original positions as shown in Fig. 1 and the pawl 71 engages another tooth of said rack bar. In that two shirts have been received in the laundry, the clerk removes another pin and the aforesaid parts operate as pointed out hereinbefore to advance the rack bar another tooth and the type roll is also rotated to bring the next quantity-indicating character into printing position.

In the present example of the invention, said type roller 62 will be provided with quantity-indicating characters from 0 to 15, and as one pin is removed from its holder, the character 1 will be brought into printing position whilst the other characters will move in sequence in accordance with the number of pins removed. The pins removed from the machine will be attached to the shirts and the same are now ready for transfer to the cleansing and laundering department. The machine is now ready to print on the laundry tag, but before discussing this operation it is necessary to return to that portion of the usage of the machine and the description of that particular procedure in a laundry wherein the clerk was preparing the laundry tag.

It has been stated hereinbefore that the clerk places the name of the customer on the laundry tag, affixes a selected pin thereto and then places the holder in the receptacle and proceeds to remove pins therefrom to agree with the number of articles on hand. Just before said holder is inserted in the receptacle it is necessary to place the laundry tag in the slot 14 since the tag locating pin is now elevated to the position shown in Fig. 8. It will be recalled that the slides 15 and 16 are adjustable to suit varying sizes of laundry tags and that the headed screw 22 is adjustable to bring the blank space opposite the word "shirt" on said tag directly beneath the proper quantity-indicating character on the type roll. These adjustments having been made the tag may be inserted in the slot 14, and when the pin holder is inserted in the receptacle and the nose portion 106 of the dog 104 has engaged behind the extension 125 of the rear wall 113 of said pin holder, the detent 108, on said dog 104, moves upwardly from the position shown in Fig. 8 and in view of the leaf spring 144, said tab release lever is oscillated to force the pin point 24a into the tag A thus preventing the removal thereof before the printing operation has taken place.

Heretofore it has been shown how a downward pull exerted on the rod 53 causes the release of the slide so that the latter may drop downwardly with the type roll 62 to make the impression on the tag A, which has now been inserted in the slot 14, and as said roll 62 has been operated to bring the character "2" into printing position it is obvious that said character will be impressed on said tag opposite the word "shirts" as indicated at 145 in Fig. 10.

It will be remembered that said pawl 70 is adapted to hold the rack bar 68 in the position to which it has been advanced by the operation of the pawl 71 during the counting operation, and it will further be recalled that said pawl 70 is adapted to oscillate in the slide 35, whilst the pawl 71 is under the control of oscillatory means borne by the main frame 5. Thus, said pawl 70 descends and ascends with the slide and hence does not change its function of maintaining said rack bar in its advanced position during the drop of the slide and during the operation of printing on the laundry tag. The pawl 71, on the contrary, swings downwardly with its ratchet teeth engaging portion resting on the lug 74 of said pawl 70. An inspection of Figs. 1 and 6 will clearly show the relative positions of said pawls, and it will be noted in said Fig. 6 that the double leaf spring 73 holds said pawls in the positions indicated. An inspection of Figs. 2 and 5 will reveal the positions assumed by the bell cranks 76 and 82, which are connected to the pawls 70 and 71, respectively, when the slide is elevated, (Fig. 2) and when the slide has dropped, (Fig. 5).

It will be remembered that the block 110 is carried by the rear face of said slide 35 and hence it descends with the latter element, and since the pin 109 on said dog 104 is positioned directly beneath said block 110, (see Figs. 2 and 3), said block, during its downward travel, encounters said pin, thus swinging said dog 104 downwardly and disengaging the nose portion 106 thereof from the extension 125 of the pin holder. The spring 103, which was tensioned during the insertion of the pin holder in its receptacle, now spends its energy in sliding the ram 99 to the position shown in Fig. 5 and thus the pin holder is ejected from its receptacle. At the same time the detent 108 of said dog 104 abuts the lever 28, (see Fig. 8), and the pin point 24a is disengaged from the tag A, which may be removed for transfer to the accounting and assembling departments of the laundry.

It is obvious that the index bar 90, under the influence of the tensioned spring 127, will slide along the slot 128 to the position shown in Fig. 5, whereas the sliding movement of said ram 99 will be limited by the stop collar 96, also shown in Fig. 5.

The slide and type roll only remains in their lowered positions long enough to make the imprint on the laundry tag and as soon as the downward pull of said rod 53 is suspended, the expansile spring 57 cause said slide and type roll to resume their initial positions, as explained in detail hereinbefore. However, it should be remembered that the ejector ram has now assumed the position shown in Fig. 5, wherein the recess 100, (see Fig. 3) has moved to the left and that portion of the ram 99 adjacent said shoulder 101 is in the path of the projection 77 of said bell crank 76, and hence, as the slide moves upwardly the abutment of said projection 77 with the portion adjacent said shoulder 101 causes said bell crank 76 to swing downwardly and in view of its connection with said pawl 70, the latter is swung upwardly and out of engagement with the ratchet teeth in said rack bar, and as it will be recalled the spring 64, (Fig. 9) was tensioned during the rotation of said type roll, it is obvious that said rack bar now assumes the position shown in Fig. 7, and the type roll rotates back to "0". At the same time the lug 74 on pawl 70 swings said pawl 71 to the position indicated in Fig. 7. Thus it would appear that the machine prints, releases the tag locating pin, ejects the pin holder and restores the type roll to its initial or "0" position by a single operation of a foot pedal, or the like.

The parts of the machine are positioned substantially as indicated in Fig. 5, with the exception that the slide 35 and pedal lever 52 are elevated and the bell crank 76 is swung downwardly with its projection held against the lower face of that portion of the ram adjacent said shoulder 101, as explained hereinbefore. Also said pawls 70 and 71 are elevated above the rack bar 68 as shown in Fig. 7, but when the clerk inserts the pin holder, as explained hereinbefore, the ejector ram slides inwardly thus moving the portion of the ram adjacent said shoulder 101 out of the path of the projection 77 of said bell crank 76, whereupon the recess 100, in said ram, permits the said bell crank to swing upwardly to the position shown in Figs. 2 and 3 and the pawl 70 under the influence of the tensioned leaf spring 73 drops to the position shown in Fig. 1 and thus engages the ratchet teeth of said rack bar. Similarly said pawl 71 drops in unison with said pawl 70 and engages the ratchet teeth of said rack bar, whereupon the usual counting operation may be resumed.

The ink ribbon mechanism, referred to hereinbefore, comprises spools 146 and 147 carried by the lateral arms 9 and 10 respectively, of the main frame 5, by means of screws 148 and 149. Each of said screws is provided with ratchet wheels 150 and 151, loosely mounted thereon and each being provided with pins 152, (see Fig. 4) to engage in the usual offset openings in the ordinary typewriter ribbon spool. Said screws 148 and 149 also carry reverse masks 153 and 154, which are also loosely mounted thereon, and which are provided with operating handles 155 and 156, whereby said masks may be partially rotated to cover the ratchet teeth of a selected ratchet wheel, said masks being held in a selected position by means of the leaf springs 157 and 158, each having a detent 159 to secure said masks in the desired positions. Spring-tensioned pawls 159a and 160 are also provided which cooperate with the ratchet wheels 150 and 151 respectively, the former being pivotally borne by a lever 161, pivoted to the main frame 5, as indicated at 162, (see Fig. 1) and having one end extending behind the slide 35 and normally held in the position indicated in Fig. 1, when the slide 35 is elevated, as by means of pin 163, or the like. When the slide 35 drops the spring 164 draws the pawl 159a upwardly, said lever 161 oscillating on its pivot point 162 to assure this movement of said pawl and it will be noted that a stop pin 165, on the main frame 5, limits this movement. As the mask 153 has uncovered the ratchet teeth of the wheel 150, said pawl 159a is free to engage said ratchet teeth and to rotate said spool 146 when the pin 163 rises with the slide 35 and encounters the end of the lever 161. The ribbon is now travelling toward the spool 146, and the ribbon 166 is moved a short distance during each printing operation.

In order to reverse the direction of the travel of said ribbon 166, said mask 153 is oscillated to remove said pawl 159a from its engagement with the ratchet wheel 150 and the ratchet teeth at this particular point are covered, as is obvious. The mask 154 associated with ratchet wheel 151 is also oscillated to uncover the ratchet teeth of said ratchet wheel, adjacent said pawl 160, whereby the latter may engage and rotate said wheel 151, and its associated spool 147 step by step. Said pawl 160 is operated in conjunction with the movement of the pedal lever 52, and upon inspection of Figs. 2 and 4, it will be noted that a lever 167 may be mounted on said pin 51 to oscillate in unison therewith, said lever 167 carrying a screw 168 at one end to which is pivotally mounted said pawl 160, a suitable spacer sleeve 169 being employed to bring said pawl in alinement with said wheel 151. When the lever 52 is depressed the pawl rides upwardly onto the ratchet teeth of said wheel 151, but when the lever 52 is restored to its initial position, said pawl 160 engages the ratchet wheel and rotates the same, as is obvious. The ribbon can thus be made to travel in both directions across the opening 170 in the base 6, certain guide rolls 171 and 172 serving to arrange said ribbon in horizontal spaced relation above said opening, and directly beneath the type roll 62.

The pin holder 111, which has been ejected from the machine, is sent to the assembling or packing room of the laundry, and as stated hereinbefore, the tag A is finally sent to the same department, where said tag and said pin holder await the coming of the laundered articles. Prior to the arrival of the laundered shirts in the packing room, the clerk has previously assembled the proper tag and the proper pin holder and it has been observed by said clerk that two shirts are to be expected which belong to the party listed on said tag and which will bear pins corresponding to said pin holder. As soon as the goods are received, the clerk compares the pins on the shirts with the pin holder and after corresponding pins and holders are found the pins are removed, and as the tag is printed "2" the clerk knows that the count is complete, whereupon the shirts are ready to be packed and delivered.

The machine is very compact and occupies but a small amount of space, and in order that no injury may occur to the operator, a cover plate 174 may be affixed to the rear face of the upstanding portion 7 to conceal the mechanism thereat. In Fig. 2 said plate 174 has been broken away.

From the foregoing it will be seen that the laundry tag is stamped with a number agreeing with the number of pins removed from the pin holder while the latter is actually in the machine and it will be recalled that it is the lifting of the lid of the holder that sets in motion the mechanism for operating the printing type roll.

The machine may be secured to a support 58 by means of bolts 173, see Fig. 1, and a foot pedal may be used to operate said rod 53, or any other suitable source of power.

While the specification has referred to shirts as the article to be handled, it will be appreciated that this reference is illustrative rather than restrictive. It will be readily understood that any class of articles may be handled, and by duplicating the printing mechanism, and increasing the number of pin holders and their receptacles different classes of goods may be handled at the same time.

While the present is a disclosure of the preferred embodiment of the invention, it is to be understood that the invention is not limited thereto, as various changes in the minor details of construction, proportion and arrangement of parts may be resorted to without departing from the spirit of the invention as defined in the appended claims.

I claim:

1. In a device of the character described, the combination with a pin holder adapted to contain identifying pins, of a type roll having quantity-indicating characters thereon, a receptacle for operatively attaching said pin holder to said device, means operated by a removal of a pin from the holder to rotate said type roll and means for lowering said type roll to printing position.

2. In a device of the character described, the combination with a pin holder adapted to contain identifying pins, of a type roll having quantity-indicating characters thereon, a receptacle for operatively attaching said pin holder to said device, means operated by a removal of a pin from the holder to rotate said type roll and means for lowering said type roll to printing position and to eject said pin holder from said receptacle.

3. In a device of the character described, the combination with a pin holder adapted to contain identifying pins, of a printable type roll having quantity-indicating characters thereon, a receptacle carried by the device, means for operatively securing said pin holder in said receptacle, means operated by the removal of pins from the holder to rotate said type roll and to advance the characters thereon step by step, means for clamping a tag beneath said type roll, means for lowering said type roll to impress a character on said tag and means operated by said lowering means to eject the pin holder from its receptacle and to permit the release of the tag from the machine.

4. In a device of the character described, the combination with a pin holder adapted to contain identifying pins, of a printable type roll having quantity-indicating characters thereon, a receptacle carried by the device, means for operatively securing said pin holder in said receptacle, means operated by the removal of pins from the holder to rotate said type roll and to advance the characters thereon in sequential relation to the number of pins removed from said holder, means for clamping a tag beneath said type roll when said pin holder is inserted in said receptacle, means for lowering said type roll to impress a character on said tag and means operated by said lowering means to eject the pin holder from its receptacle, to restore said type roll to its initial position and to permit the release of the tag from the machine.

5. In a device of the character described, the combination with a pin holder adapted to contain identifying pins, of a printable type roll having quantity-indicating characters thereon, a reciprocatory slide for supporting said roll, a receptacle attached to said device, means for operatively securing said pin holder in said receptacle, means operated by the removal of the pins from the holder to advance said type roll step by step, means for maintaining said roll in its advanced rotated position as single pins are removed from said holder, and means for reciprocating said slide and roll to printing position and to eject said holder from said receptacle.

6. In a device of the character described, the combination with a pin holder adapted to contain identifying pins, of a printable type roll having quantity-indicating characters thereon, a reciprocatory slide for supporting said roll, a receptacle attached to said device, means for operatively securing said pin holder in said receptacle, means operated by the removal of the pins to rotate said type roll step by step, means for maintaining said roll in its advanced rotated position as single pins are removed from said holder, means for clamping a tag beneath said type roll, means for reciprocating said slide and roll to impress a character on said tag and means operating during the reciprocation of said slide to eject said holder from its receptacle, to restore said type roll to its initial position and to permit the removal of the tag from the device.

7. In a device of the character described, the combination with a pin holder adapted to contain identifying pins, of a printable spring-tensioned type roll having quantity-indicating characters thereon, a reciprocatory slide carrying said roll, means for maintaining said slide and roll in an elevated position, a receptacle attached to said device, means for operatively connecting said pin holder within said receptacle, means operated by a removal of a pin from said holder to rotate said type roll, means for maintaining said roll in its rotated condition as single pins are removed from said holder, means for clamping a tag beneath said type roll, said means being operated by the insertion of the pin holder in said receptacle, means for reciprocating said slide and roll and means operated during the reciprocation of said slide whereby said type roll is freed to return to its initial position and whereby said pin holder and tag are rendered releasable from said device.

8. In a device of the character described, the combination with a pin holder adapted to contain identifying pins, of a printable spring-tensioned type roll having quantity-indicating characters thereon, a reciprocatory slide carrying said roll, means for maintaining said slide and roll in an elevated position, a receptacle attached to said device, means for operatively connecting said pin holder within said receptacle, means operated by the removal of the pins from the holder to rotate said roll step by step, means for maintaining said roll in its rotated condition during the removal of single pins from the holder, means for clamping a tag beneath said type roll, said means being operated by the insertion of the pin holder in said receptacle, an inked ribbon positioned below said roll, means for reciprocating said slide and roll, and ribbon feed mechanism operable during the reciprocation of said slide, and means operated during the reciprocation of said slide to eject said receptacle, to restore said roll to its initial position and to release said tag.

9. In a device of the character described including a reciprocatory printable type roll adapted to be rotated step by step and slidable means for rotating said roll, of a pin holder adapted to be attached to said machine, said pin holder comprising a spring-tensioned lid having a lug adapted to contact and reciprocate said slidable means to rotate said type roll as the lid is opened.

10. In a device of the character described, the combination with a pin holder having a lid and adapted to contain identifying pins, of a type roll having quantity-indicating characters thereon and means operated by the opening of the lid of said pin holder to rotate said type roll.

11. In a device of the character described, the combination with a pin holder having a lid and adapted to contain identifying pins, of a type roll having quantity-indicating characters thereon, means for attaching said pin holder to the device and means operated by the opening of the lid of said pin holder to rotate said type roll.

In testimony whereof I affix my signature.

HENRY HIRSCH.